United States Patent [19]

Storm et al.

[11] Patent Number: 5,004,139
[45] Date of Patent: Apr. 2, 1991

[54] VEHICLE ARTICLE HOLDER

[75] Inventors: Manfred Storm; Greg J. Storm, both of Chesire, Conn.

[73] Assignee: Hagus, U.S.A., Inc., Clinton, Conn.

[21] Appl. No.: 408,072

[22] Filed: Sep. 15, 1989

[51] Int. Cl.$^5$ .......................... B60R 9/00; B60R 9/048
[52] U.S. Cl. ..................................... 224/324; 224/917; 224/317; 224/309; 224/331; 224/330; 224/326
[58] Field of Search ............... 224/324, 309, 310, 315, 224/317, 320, 325, 326, 330, 331, 917

[56] References Cited

U.S. PATENT DOCUMENTS

| | | | |
|---|---|---|---|
| 4,244,501 | 1/1981 | Ingram | 224/324 |
| 4,261,496 | 4/1981 | Mareydt et al. | 224/315 |
| 4,264,025 | 4/1981 | Ferguson et al. | 224/324 |
| 4,442,961 | 4/1984 | Bott | 224/324 |
| 4,460,116 | 7/1984 | Bott | 224/324 |
| 4,469,261 | 9/1984 | Stapleton et al. | 224/326 |
| 4,473,178 | 9/1984 | Bott | 224/32.4 |
| 4,911,348 | 3/1990 | Rasor et al. | 224/325 |

*Primary Examiner*—Henry J. Recla
*Assistant Examiner*—Keith Kupferschmid
*Attorney, Agent, or Firm*—Robert H. Montgomery

[57] ABSTRACT

An article carrier for a motor vehicle comprising a pair of side rails adapted to be mounted to the roof of a vehicle in spaced apart relationship and extend longitudinally of the length of the vehicle. The side rails define a guideway therein, further defined by upper and lower surfaces. First and second pairs of stanchions are provided supporting a cross rail therebetween generally perpendicular to the side rails. Each of the stanchions have a bottom wall with engaging members integral therewith extending therefrom and received in the guideways and slidable therein. The guideways capture the engaging members therein and permit only sliding movements of the engaging members therein. A recess is defined in the bottom all of the stanchions and a clamping member is received in the recess. The clamping member is rotatable in the recess and has a camming portion extending into the guideway. The camming portion has lands thereon arranged to engage one of the upper and lower surfaces when in a first position to clamp the stanchion in the side rails and when in a second position to permit sliding movement of the stanchion engaging members in the guideways of the side rails.

20 Claims, 2 Drawing Sheets

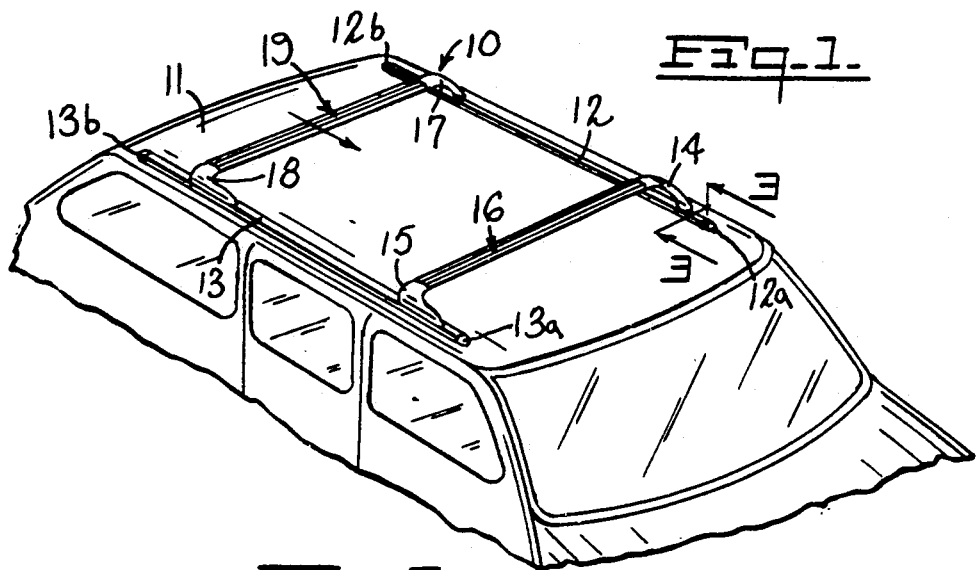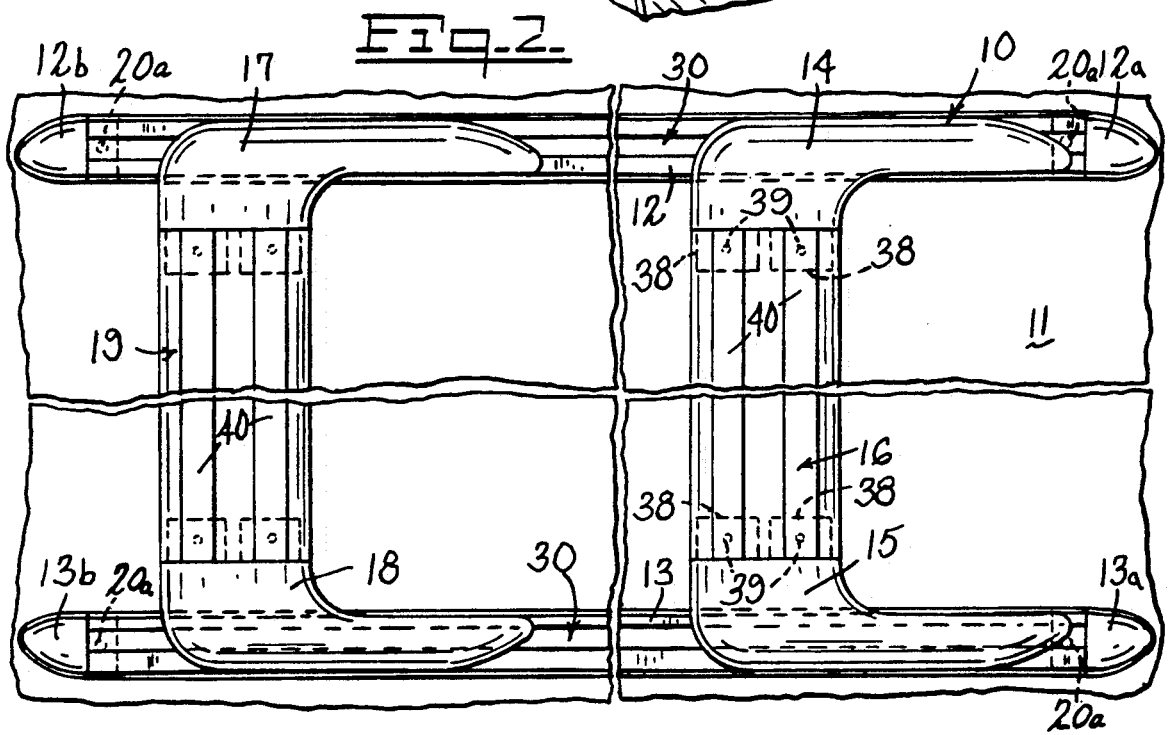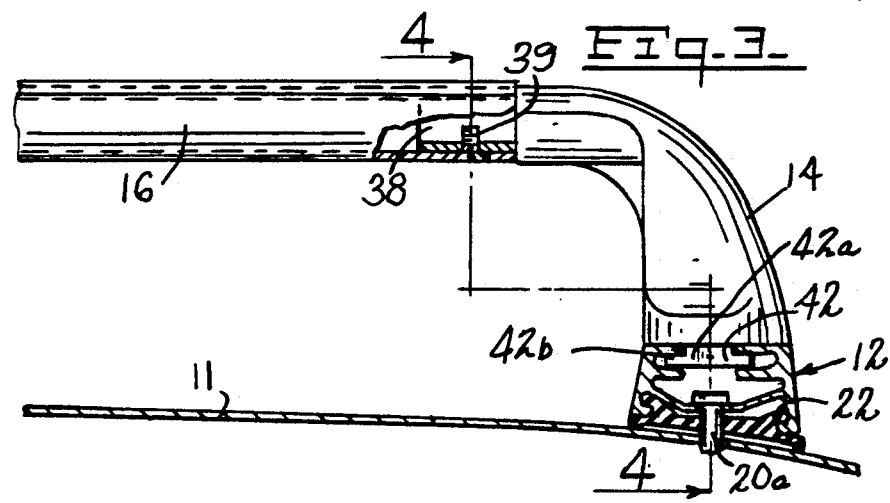

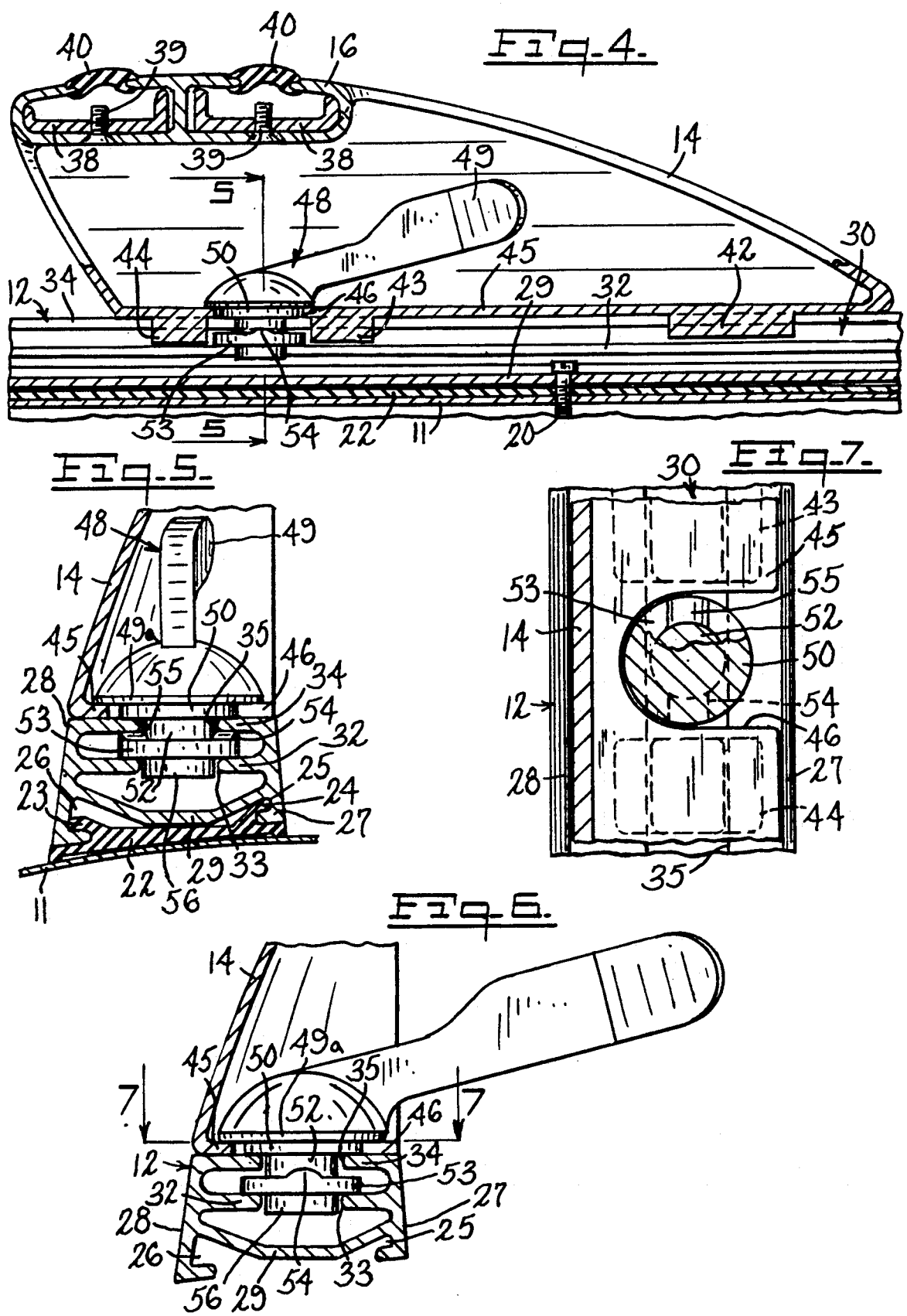

VEHICLE ARTICLE HOLDER

FIELD OF THE INVENTION

This invention relates to an adjustable vehicle article carrier which is particularly useful on the type of vehicles known as station wagons.

BACKGROUND OF THE INVENTION

Article carriers or so called roof racks are popular as a useful accessory for motor vehicles. Such roof racks commonly include spaced apart supporting or side rails secured to the roof of a motor vehicle extending longitudinally of the vehicle and have article restraining bars or cross rails extending therebetween. Usually, these restraining bars or cross rails are adjustable in spacing therebetween on the supporting side rails so as to enable varying size articles to be restrained therebetween or tied thereto.

In such cases, the restraining bars or cross rails will have members on the ends thereof interfitting on opposite ends thereof with the support or side rails in sliding engagement, and will include fastening means to secure the restraining bar or cross rails in a given position with respect to the side rails.

A typical arrangement includes an assembly of four stanchions which support the side rails a given distance above the roof of the vehicle. The side rails are generally an extrusion a guideway therein and means are provided on the ends of the restraining bars interfitted into these guideways. Means will also be affixed to the restraining bars or cross rails at either end thereof to in some manner clamp the restraining bars to the side rails in a preselected position. The fastening means in some cases include devices operated by an Allen head wrench and in other cases include a locking cam. Varied and diverse locking mechanisms have been proposed.

These known article carriers generally comprise many parts, require secondary assembly operations particularly in the clamping mechanisms and are not easily assembled to the roof of an automobile.

Accordingly, the present invention provides a new and improved article mounting structure for the roof of an automotive vehicle which is easy to manufacture and install on such vehicle and requires no secondary assembly operations, but only the assembly of a minimal number of pieces to provide the complete structure.

SUMMARY OF THE INVENTION

Briefly stated, the invention in one form thereof, comprises an article carrier for a motor vehicle comprising a pair of side rails adapted to be mounted to the roof of a vehicle in laterally spaced apart relationship which extend longitudinally of the length of the vehicle. The side rails are identical in configuration. The side rails define a guideway or channel therein defined by upper and lower surfaces. First and second pairs of stanchions are provided, each pair supporting a cross rail therebetween generally perpendicular to the side rails. Either one or both pairs of stanchions have a bottom wall with engaging means integral therewith extending therefrom which are received in the guideways and are slidable therein. The guideways capture the stanchion engaging means therein and permit only sliding movement of the engaging means therein. A recess is defined in the bottom wall of the stanchions and a clamping member is received in said recess and rotatable therein. The clamping member has a camming portion extending into the guideway with lands thereon arranged to engage one of the upper and lower surfaces defining the guideway when in a first position to clamp a stanchion in the side rails, and when in a second position to permit sliding movement of the stanchion engaging means in the of the side rails.

The construction facilitates assembly to the roof of a vehicle. In assembly, the side rails with the stanchions and cross rails mounted thereto are located on the roof of a vehicle and the side rails are secured to the roof. Then the only further assembly steps required are the provision of end caps on the side rails. The end caps are secured to the ends of the side rails with a common fastening means and prevent withdrawl of the stanchions from the side rails.

Either on or both of the stanchion pairs may be slidable in the side rails.

An object of this invention is to provide a new and improved article carrier or roof rack for an automobile.

Another object of this invention is to provide a new and improved article carrier or roof rack for an automobile which is easily installed on the automobile.

A further object of this invention is to provide a new an improved article carriers roof rack which is easily installed on an automobile without any secondary assembly operations.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

BRIEF DESCRIPTION OF THE DRAWINGS

FIG. 1 is an isometric view of the upper portion of an automobile showing a article carrier embodying the invention installed thereon;

FIG. 2 is a fragmentary plan view of the article carrier on the automobile of FIG. 1;

FIG. 3 is a view seen in the plane of lines 3—3 of FIG. 1;

FIG. 4 is a view seen in the planes of lines 4—4 of FIG. 3;

FIG. 5 is a view seen in the plane of lines 5—5 of FIG. 4 when a stanchion is clamped to a side rail;

FIG. 6 is a view similar to FIG. 5 but showing the clamping mechanism in an unclamped position; and FIG. 7 is a view seen in the plane of line 7—7 of FIG. 6.

DETAILED DESCRIPTION OF A PREFERRED EMBODIMENT OF THE INVENTION

As shown in FIG. 1 an article carrier or roof rack 10 is mounted to the roof of an automotive vehicle 11 of the station wagon type. Article carrier 10 comprises spaced apart side rails 12 and 13 mounted longitudinally with respect to the length of the vehicle by any one of several means hereinafter stated. Rail 12 has a forward end cap 12a and a rear end cap 12b while rail 13 has a forward end cap 13a and a rear end cap 13b.

The end caps are identical in construction, however, two are mirror images of the others as will hereinafter be made apparent. Slidably mounted in rails 12 and 13 are a first set of stanchions 14 and 15 carrying a cross memeber or rail 16 therebetween at the forward end of the roof of vehicle 11. Towards the rear end of the roof vehicle 11 are a second set of stanchions 17 and 18 having a cross member or rail 19 therebetween. As will hereinafter be pointed out, the stanchions together with the associated cross member are slidably adjustable along the length of the roof. One set of stanchions may be fixed if desired, and only the other slidable in side rails 12 and 13. While the following descriptions shows stanchion pairs 14 and 15 as slidable, this stanchion pair may by fixed and the rear stanchion pair slidable.

Reference is now made to FIG. 3 which shows rail 12 fastened to the roof of vehilce 11 by means of a plurality of fastening members 20 (only one shown) which may be in the form of sheet metal bolts, riv nuts, or molly jack nuts. Such fasteners are used at spaced apart intervals along the length of each of rails 12 and 13 and additionally extend through each of the end caps 12a, 12b, 13a, and 13b as hereinafter described.

Received within and disposed below each of rails 12 and 13 is a gasketing material 22 which is extruded with ears 23 and 24 received within elongated openings 25 and 26 respectively within rails 12 and 13 as more clearly shown in FIG. 5.

The end caps 12a, 12b, 13a and 13b are mounted to the roof of the vehicle 11 by fastening members 20a extending through the ends of rails 12 and 13 into the end caps. The end caps are formed to telescopically fit into the rails 12 and 13, or vice versa.

The end caps provide a stop for a channel in the side rails, hereinafter described. The fastening members 20 and 20a extend through both the side rails and the end caps. Further definition of the end caps is not necessary inasmuch as this merely goes to the the esthetic purposes of the design. While four end caps are required, only two different types are required, one being the mirror image of the other.

Reference is now made to FIGS. 5 and 6 for a description of the construction of the rails 12 and 13. Each of the rails are identical and designed to fit a sloping or slightly curved portion of the roof of a vehicle 11. The rails have sidewalls 27 and 28 with a lower bridging portion 29 extending between side walls 27 and 28. The fastening means as exemplified by the reference numeral 20 in FIG. 3 extend through member 29. The rails further define a longitudinally extending guideway or channel 30 which is generally horizontally extending.

Channel 30 is defined by a lower wall 32 having a longitudinal opening or passage 33 therein and an upper wall 34 having another longitudinal opening or passage 35 therein. The walls 32 and 34 define opposed surfaces on either side of channel 30. The purpose of the passages 33 and 35 are hereinafter described.

Reference is now made to FIGS. 3 and 4. A stanchion as exemplified by stanchion 14 has projections 38 defined thereon which are telescopically received into the cross members as exemplified by cross member 16 in FIGS. 3 and 4. The cross members receive fastening devices in the form of bolts 39 therethrough extending into each of the projections 38 on the stanchions. The cross members 16 and 19 are also extrusions and are formed to receive elongated plastic pads 40 therein which extend across the cross members. Each of the stanchions have engaging means in the form of inverted T-shaped members 42, 43 and 44 thereon as shown in FIG. 3 by member 42. These T-shaped members are preferably integral with the bottom wall 45 of each of the stanchions and are received and captured in channel 30. The T-shaped members as shown are inverted and as exemplified in FIG. 3 by member 42 each has a stem portion 42a and a cross head portion 42b. Thus, one or both pairs of stanchions, when permitted may freely slide along the rails 12 and 13 in channels 30.

Reference is now specifically made to FIGS. 4, 5, 6 and 7. Defined in the stanchions, as identified by the stanchion 14 in FIG. 4 is a recess 46 in the bottom wall 45 thereof which recess is defined between T-shaped members 43 and 44.

Received within this recess is a clamping member generally indicated by the reference numeral 48 which includes a hand operated handle 49. Clamping member 48 has a portion 49a (FIGS. 5 and 6) overlying bottom wall 45 and the edges of recess 46 defined therein of the stanchions and a portion 50 of reduced diameter which is received within recess 46 to provide stability. Clamping member 48 further has a shank portion 52 which is received in passage 35 and a camming portion 53 which is received within channel 30. Camming portion 53 has lands 54 and 55 defined thereon which are adapted to either contact or not contact the underside of wall 34 and frictionally clamp a stanchion to a rail. Optionally, the lands 54 and 55 could be defined on the underside of camming portion 53 and engage lower wall 32.

In FIG. 5, the lands 54 and 55 are shown in frictional and clamping engagement with members 32 and 34 which is also the condition in FIG. 4.

In the position shown of clamping member 48 in FIG. 6 it will be noted that the lands as indicated by land 54 are not in a clamping position and will allow the stanchions to slide freely on the rails 12 and 13.

The clamping member 48 further have a lower boss 56 thereon received between the edges of wall 32 in channel 33. This boss 56 provides a means of guiding clamping members 48 in the slide rails. Thus there is no tendency for the clamping member to be withdrawn or move out of recess 46.

The stanchions 14, 15, 17 and 18 are all one piece cast constructions including the integral T-shaped members 42, 43 and 44. The side rails 12 and 13 are extrusions as are the cross members 16 and 19. The clamping device 48 is formed in one piece.

It will apparent that this roof rack may be easily assembled to the roof of an automotive vehicle merely by assembling the stanchions with cross rails 16 and 19 thereon then aligning the rails 12 and 13 on the roof of the vehicle, fastening the side rails to the roof by use of suitable fastening devices through bridging members 27 and then applying the finishing touches by joining the end caps to the side rails.

This construction as previously pointed out, utilizes only a small number of different pieces. Its easy to install on an automobile and requires no secondary assembly operations after the side rails have been secured to the automobile.

It may thus be seen that the objects of the invention set forth, as will as those made apparent from the foregoing description, are efficiently attained. While a preferred embodiment of the invention have been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention.

What is claimed is:

1. An article carrier for a motor vehicle comprising a pair of side rails adapted to be mounted to the roof of a vehicle in spaced apart relationship and extend longitudinally of the length of the vehicle, each of said side rails defining a guideway therein defined by upper and lower walls having opposed upper and lower surfaces, said upper wall having a longitudinal opening defined therein of predetermined width, a pair of stanchions supporting a cross rail therebetween generally perpendicular to said side rails, said stanchions having a bottom wall with engaging means extending therefrom and received in said guideways and slidable therein, said guideways capturing said engaging means therein and permitting only sliding movement of said engaging means therein, a recess defined in said bottom wall of said stanchions, a clamping member received in said recess, said clamping member being rotatable and having a clamping portion extending into said guideway and rotatable with said clamping member therein, said clamping portion having a dimension greater than said predetermined width, said clamping portion having clamping means thereon arranged to clampingly engage said lower surface of said upper wall when in a first position to clamp said stanchion in said side rails and when in a second position rotated from said first position to extend into said longitudinal opening and permit sliding movement of said stanchion engaging means in said side rails with said clamping means in said longitudinal opening of said upper wall.

2. An article carrier as claimed in claim 1 wherein said guideways are horizontally disposed generally perpendicular to longitudinal length, said upper walls having a longitudinal opening defined therein for receipt of said clamping members, said clamping members having a portion extending through said recess and including said clamping portion interposed between said upper and lower walls, said clamping means comprising lands on said clamping portion adaptable to be received in said longitudinal opening in said upper walls and permit sliding motion of said at least one of said pair of stanchions therein, when said clamping means is in said second position.

3. The article carrier of claim 1 where said clamping members have a radially extending handle thereon for facilitating rotation of said clamping members and said clamping portions between said first and second positions.

4. The article carrier of claim 1 further including a longitudinal opening in said lower walls said clamping member having a boss thereon extending into said longitudinal opening in said lower walls and providing a guide for said clamping members in said lower walls.

5. The article carrier of claim 4 wherein said clamping members are of a one piece construction.

6. The article carrier of claim 4 where said clamping members have a handle thereon for facilitating rotation of said clamping members.

7. The article carrier of claim 1 wherein said engaging means are integral with said bottom walls of said stanchions.

8. The article carrier of claim 1 wherein said engaging means are of inverted T-shape having a stem portion and a cross head portion and the cross head of said T-shape is captured in said guideway.

9. The article carrier of claim 1 wherein said camming portion has diametrically opposed lands thereon arranged to engage one of said upper and lower surfaces when in said first position.

10. An article carrier for a motor vehicle comprising a pair of side rails adapted to be mounted to the roof of a vehicle in spaced apart relationship and extend longitudinally of the length of the vehicle, said side rails defining a guideway therein defined by upper and lower walls having upper and lower facing surfaces, a pair of stanchions, said stanchions supporting a cross rail therebetween generally perpendicular to said side rails, each of said stanchions of said pair having a bottom wall with engaging means integral therewith extending therefrom and received in said guideways and slidable therein, said guideways capturing said engaging means therein and permitting only sliding movement of said engaging means therein.

a recess defined in said bottom wall of said stanchions, a clamping member received in said recess, said clamping member being rotatable in said recess and having a camming portion extending into said guideway, said upper and lower surfaces being defined by upper and lower walls each having a longitudinal passage therein, and a guide member extending from said clamping members into the longitudinal passages of said lower walls, said camming portion having means thereon arranged to engage one of said upper and lower surfaces when in a first position to clamp said stanchion in said side rails and when in a second position to permit sliding movement of said stanchion engaging means in said guideways of said side rails.

11. The article carrier of claim 10 wherein said camming portion has diametrically opposed lands thereon arranged to engage one of said upper and lower surfaces when in said first position.

12. The article carrier of claim 10 where said side rails have a lower bridging portion between two opposed sidewalls and means are provided through said bridging portion for attachment of said side rails to the roof of an automotive vehicle.

13. The article carrier of claim 10 where said clamping means have a portion overlying the edges of said recess, a portion extending into the passage of said upper wall, said camming portion residing between said upper and lower surfaces and adapted to frictionally engage one of said upper and lower surfaces when in said first position.

14. The article carrier of claim 13 further including a handle portion on said clamping member to facilitate rotation thereof.

15. The article carrier of claim 10 wherein said means on said camming portion are lands which reside in said passages when said clamping means is in said second position.

16. An article carrier for a motor vehicle comprising a pair of side rails adapted to be mounted to the roof of a vehicle in spaced apart relationship and extend longitudinally of the length of the vehicle.

each of said side rails defining a guideway therein defined by upper and lower walls having opposed upper and lower surfaces, one of said upper and lower walls having a longitudinal opening therein of predetermined width, a pair of stanchions supporting a cross rail therebetween generally perpendicular to said side rails, said stanchions having bottom wall with engaging means extending therefrom and received in said guideways and slidable therein, said guideways capturing said engaging means therein and permitting only sliding movement of said engaging means therein, a recess defined in said bottom wall of said stanchions, a clamping member received in said recess, said clamping member being rotatable in said recess and having a camming portion rotatable therewith and extending into said guideways, said camming portion having means thereon arranged to compressively engage one of said upper and lower walls having said longitudinal opening therein when in a first rotative position to clamp said stanchion in said side rails and when in a second rotative position to permit sliding movement of said camming means and stanchion engaging means in said guideways of said side rails with said camming means in said longitudinal opening in said one of said walls.

17. An article carrier as claimed in claim 16 wherein said guideways are horizontally disposed generally perpendicular to longitudinal length, said upper walls having a longitudinal opening defined therein for receipt of said clamping member, said clamping member having a portion extending through said recess and including said camming portion interposed between said upper and lower walls, said camming portion comprising lands adaptable to be received in said longitudinal opening in said one of said upper and lower walls and permit sliding motion of said at least one of said pair of stanchions therein.

18. The article carrier of claim 16 where said clamping member has a radially extending handle thereon for facilitating rotation of said clamping member.

19. The article carrier of claim 16 wherein said clamping member is a one piece construction.

20. The article carrier of claim 16 wherein said camming portion has diametrically opposed lands thereon arranged to engage said one of said upper and lower surfaces when in said first position.

* * * * *